United States Patent
Lin et al.

(10) Patent No.: US 10,706,056 B1
(45) Date of Patent: Jul. 7, 2020

(54) AUDIT LOG REPORT GENERATOR

(71) Applicant: Palantir Technologies Inc., Palo Alto, CA (US)

(72) Inventors: Amerson Lin, Singapore (SG); Kiat Chuan Tan, Singapore (SG); Daniel Li, Singapore (SG); Huixian Chen, Singapore (SG); Alexander Vasilyev, Singapore (SG); Paul Hadjy, Nokesvile, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 189 days.

(21) Appl. No.: 15/295,864

(22) Filed: Oct. 17, 2016

Related U.S. Application Data

(60) Provisional application No. 62/262,327, filed on Dec. 2, 2015.

(51) Int. Cl.
*G06F 7/00* (2006.01)
*G06F 16/2457* (2019.01)
(Continued)

(52) U.S. Cl.
CPC .... *G06F 16/24573* (2019.01); *G06F 16/2457* (2019.01); *H04L 63/308* (2013.01)

(58) Field of Classification Search
CPC ........... G06F 17/30522; G06F 16/2457; G06F 16/24573
See application file for complete search history.

(56) References Cited

U.S. PATENT DOCUMENTS

| | | |
|---|---|---|
| 5,515,488 A | 5/1996 | Hoppe et al. |
| 6,430,305 B1 | 8/2002 | Decker |

(Continued)

FOREIGN PATENT DOCUMENTS

| | | |
|---|---|---|
| CN | 102546446 A | 7/2012 |
| CN | 103167093 A | 6/2013 |

(Continued)

OTHER PUBLICATIONS

"5 Great Tools for Visualizing your Twitter Followers", Amnet Blog, http://www.amnetblog.com/component/content/article/115-5-great-tools-for-visualizing-your-twitter-followers.html, (Aug. 4, 2010), 1-5.

(Continued)

*Primary Examiner* — Kannan Shanmugasundaram
(74) *Attorney, Agent, or Firm* — Schwegman Lundberg & Woessner, P.A.

(57) ABSTRACT

A method of generating a supplemental user interface is disclosed. At a client system, it is detected that an alert identifying a suspicious activity that is to be reviewed by a user of the client system has been received. A template for a user interface is accessed. The template includes database queries and instructions for presenting data items derived from query results corresponding to the database queries in the user interface. The instructions include a mapping of the data items to data fields of the user interface. Data items derived from the query results are presented in the user interface based on the instructions included in the template. An audit log is updated based on an acceptance by the user of the data items presented in the user interface.

15 Claims, 6 Drawing Sheets

(51) Int. Cl.
*H04L 29/06* (2006.01)
*G06F 17/00* (2019.01)

(56) References Cited

U.S. PATENT DOCUMENTS

| | | |
|---|---|---|
| 6,820,135 B1 | 11/2004 | Dingman et al. |
| 6,978,419 B1 | 12/2005 | Kantrowitz |
| 6,980,984 B1 | 12/2005 | Huffman et al. |
| 7,168,039 B2 | 1/2007 | Bertram |
| 7,461,077 B1 | 12/2008 | Greenwood et al. |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,037,046 B2 | 10/2011 | Udezue et al. |
| 8,046,283 B2 | 10/2011 | Burns et al. |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,577,911 B1 | 11/2013 | Stepinski et al. |
| 8,589,273 B2 | 11/2013 | Creeden et al. |
| 8,688,573 B1 | 4/2014 | Rukonic et al. |
| 8,744,890 B1 | 6/2014 | Bernier et al. |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 2002/0065708 A1 | 5/2002 | Senay et al. |
| 2002/0095360 A1 | 7/2002 | Joao |
| 2002/0095658 A1 | 7/2002 | Shulman et al. |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0027676 A1* | 2/2005 | Eichstaedt ............... G06F 9/542 |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0085444 A1* | 4/2006 | Sarawgi ............... G06F 17/3046 |
| 2006/0143034 A1 | 6/2006 | Rothermel et al. |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga et al. |
| 2007/0162454 A1 | 7/2007 | D' Albora et al. |
| 2007/0179986 A1* | 8/2007 | Adam ............... G06F 21/552 |
| 2007/0185867 A1 | 8/2007 | Maga et al. |
| 2007/0192122 A1 | 8/2007 | Routson et al. |
| 2007/0284433 A1 | 12/2007 | Domenica et al. |
| 2008/0065655 A1 | 3/2008 | Chakravarthy et al. |
| 2008/0069081 A1 | 3/2008 | Chand et al. |
| 2008/0077642 A1 | 3/2008 | Carbone |
| 2008/0103996 A1 | 5/2008 | Forman et al. |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic et al. |
| 2009/0125459 A1 | 5/2009 | Norton et al. |
| 2009/0132953 A1 | 5/2009 | Reed, Jr. et al. |
| 2009/0157732 A1 | 6/2009 | Hao et al. |
| 2009/0187546 A1 | 7/2009 | Whyte |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0307049 A1 | 12/2009 | Elliott, Jr. et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith |
| 2010/0070842 A1 | 3/2010 | Aymeloglu et al. |
| 2010/0098318 A1 | 4/2010 | Anderson |
| 2010/0106752 A1 | 4/2010 | Eckardt, III et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0262688 A1 | 10/2010 | Hussain et al. |
| 2010/0293174 A1 | 11/2010 | Bennett |
| 2010/0312837 A1 | 12/2010 | Bodapati et al. |
| 2010/0332554 A1* | 12/2010 | Blair ............... G06F 17/30551 707/802 |
| 2011/0010379 A1* | 1/2011 | Gilderman ............ G06F 17/3056 707/759 |
| 2011/0040776 A1 | 2/2011 | Najm et al. |
| 2011/0061013 A1 | 3/2011 | Bilicki et al. |
| 2011/0078173 A1 | 3/2011 | Seligmann et al. |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin et al. |
| 2011/0218955 A1 | 9/2011 | Tang et al. |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |

(56) References Cited

U.S. PATENT DOCUMENTS

| | | |
|---|---|---|
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0101927 A1* | 4/2012 | Leibon ............... G06Q 40/00 705/35 |
| 2012/0131512 A1 | 5/2012 | Takeuchi et al. |
| 2012/0144335 A1 | 6/2012 | Abeln et al. |
| 2012/0158527 A1 | 6/2012 | Cannelongo |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss et al. |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla et al. |
| 2013/0055145 A1 | 2/2013 | Antony et al. |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson et al. |
| 2013/0185307 A1 | 7/2013 | El-Yaniv et al. |
| 2013/0218879 A1 | 8/2013 | Park et al. |
| 2013/0226318 A1 | 8/2013 | Procyk et al. |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0344230 A1 | 11/2014 | Krause et al. |
| 2014/0358829 A1 | 12/2014 | Hurwitz |
| 2014/0365523 A1* | 12/2014 | Wagner ............ G06F 16/24565 707/770 |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0278347 A1* | 10/2015 | Meyer ............... G06F 17/30327 707/714 |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0180557 A1 | 6/2016 | Yousaf et al. |

FOREIGN PATENT DOCUMENTS

| | | |
|---|---|---|
| CN | 1020540156 | 5/2014 |
| DE | 102014204827 A1 | 9/2014 |
| DE | 102014204830 A1 | 9/2014 |
| DE | 102014204834 A1 | 9/2014 |
| EP | 2487610 A2 | 8/2012 |
| EP | 2858018 A1 | 4/2015 |
| EP | 2869211 A2 | 5/2015 |
| EP | 2889814 A1 | 7/2015 |
| EP | 2892197 A1 | 7/2015 |
| EP | 2963595 A1 | 1/2016 |
| EP | 2996053 A1 | 3/2016 |
| EP | 3035214 | 6/2016 |
| EP | 3038002 | 6/2016 |
| EP | 3040885 | 7/2016 |
| WO | WO-2005116851 A2 | 12/2005 |
| WO | WO-2012061162 | 5/2012 |

OTHER PUBLICATIONS

"About OWA", Open Web Analytics, [Online]. Retrieved from the Internet: <URL: http://www.openwebanalytics.com/?page_jd=2>, (Accessed: Jul. 19, 2013), 5 pgs.

"An Introduction to KeyLines and Network Visualization", Keylines. com, [Online]. Retrieved from the Internet: <URL: http://keylines.com/wp-content/uploads/2014/03/KeyLines-White-Paper.pdf>, (Mar. 2014), 8 pgs.

"Analytics for Data Driven Startups", Trak.io, [Online]. Retrieved from the Internet: <URL: http://trak.io/>, (Accessed: Jul. 18, 2013), 3 pgs.

"Appacts: Open Source Mobile Analytics Platform", http://www.appacts.com, (Jul. 18, 2013), 1-4.

"U.S. Appl. No. 13/827,491, Final Office Action dated Jun. 22, 2015", 28 pgs.

"U.S. Appl. No. 13/827,491, Non Final Office Action dated Oct. 9, 2015", 16 pgs.

"U.S. Appl. No. 13/827,491, Non Final Office Action dated Dec. 1, 2014", 5 pgs.

"U.S. Appl. No. 14/141,252, Final Office Action dated Apr. 14, 2016", 28 pgs.

"U.S. Appl. No. 14/141,252, Non Final Office Action dated Oct. 8, 2015", 11 pgs.

"U.S. Appl. No. 14/225,006, Advisory Action dated Dec. 21, 2015", 4 pgs.

"U.S. Appl. No. 14/225,006, Final Office Action dated Sep. 2, 2015", 28 pgs.

"U.S. Appl. No. 14/225,006, First Action Interview Pre-Interview Communication dated Feb. 27, 2015", 5 pgs.

"U.S. Appl. No. 14/225,006, First Action Interview Pre-Interview Communication dated Sep. 10, 2014", 4 pgs.

"U.S. Appl. No. 14/225,084, Examiner Interview Summary dated Jan. 4, 2016", 3 pgs.

"U.S. Appl. No. 14/225,084, Final Office Action dated Feb. 26, 2016", 14 pgs.

"U.S. Appl. No. 14/225,084, First Action Interview Pre-Interview Communication dated Feb. 20, 2015", 5 pgs.

"U.S. Appl. No. 14/225,084, First Action Interview Pre-Interview Communication dated Sep. 2, 2014", 17 pgs.

"U.S. Appl. No. 14/225,084, Non Final Office Action dated Sep. 11, 2015", 13 pgs.

"U.S. Appl. No. 14/225,084, Notice of Allowance dated May 4, 2015", 26 pgs.

"U.S. Appl. No. 14/225,160, Advisory Action dated May 20, 2015", 7 pgs.

(56) References Cited

OTHER PUBLICATIONS

"U.S. Appl. No. 14/225,160, Examiner Interview Summary dated Apr. 22, 2016", 7 pgs.
"U.S. Appl. No. 14/225,160, Final Office Action dated Jan. 25, 2016", 25 pgs.
"U.S. Appl. No. 14/225,160, Final Office Action dated Feb. 11, 2015", 30 pgs.
"U.S. Appl. No. 14/225,160, First Action Interview Pre-Interview Communication dated Jul. 29, 2014", 19 pgs.
"U.S. Appl. No. 14/225,160, First Action Interview Pre-Interview Communication dated Oct. 22, 2014", 6 pgs.
"U.S. Appl. No. 14/225,160, Non Final Office Action dated Jun. 16, 2016", 14 pgs.
"U.S. Appl. No. 14/225,160, Non Final Office Action dated Aug. 12, 2015", 23 pgs.
"U.S. Appl. No. 14/306,138, Examiner Interview Summary dated Dec. 3, 2015", 3 pgs.
"U.S. Appl. No. 14/306,138, Examiner Interview Summary dated Dec. 24, 2015", 5 pgs.
"U.S. Appl. No. 14/306,147, Final Office Action dated Dec. 24, 2015", 22 pgs.
"U.S. Appl. No. 14/319,161, Final Office Action dated Jan. 23, 2015", 21 pgs.
"U.S. Appl. No. 14/319,161, Notice of Allowance dated May 4, 2015", 6 pgs.
"U.S. Appl. No. 14/319,765, Non Final Office Action dated Feb. 1, 2016", 10 pgs.
"U.S. Appl. No. 14/323,935, Notice of Allowance dated Oct. 1, 2015", 8 pgs.
"U.S. Appl. No. 14/451,221, Non Final Office Action dated Oct. 21, 2014", 16 pgs.
"U.S. Appl. No. 14/463,615, Advisory Action dated Sep. 10, 2015", 3 pgs.
"U.S. Appl. No. 14/463,615, Final Office Action dated May 21, 2015", 31 pgs.
"U.S. Appl. No. 14/463,615, First Action Interview Pre-Interview Communication dated Jan. 28, 2015", 29 pgs.
"U.S. Appl. No. 14/463,615, First Action Interview Pre-Interview Communication dated Nov. 13, 2014", 4 pgs.
"U.S. Appl. No. 14/463,615, Non Final Office Action dated Dec. 9, 2015", 44 pgs.
"U.S. Appl. No. 14/479,863, First Action Interview Pre-Interview Communication dated Dec. 26, 2014", 5 pgs.
"U.S. Appl. No. 14/479,863, Notice of Allowance dated Mar. 31, 2015", 23 pgs.
"U.S. Appl. No. 14/483,527, Final Office Action dated Jun. 22, 2015", 17 pgs.
"U.S. Appl. No. 14/483,527, First Action Interview Pre-Interview Communication dated Jan. 28, 2015", 6 pgs.
"U.S. Appl. No. 14/483,527, Non Final Office Action dated Oct. 28, 2015", 20 pgs.
"U.S. Appl. No. 14/483,527, Notice of Allowance dated Apr. 29, 2016", 34 pgs.
"U.S. Appl. No. 14/552,336, First Action Interview Pre-Interview Communication dated Jul. 20, 2015", 18 pgs.
"U.S. Appl. No. 14/552,336, Notice of Allowance dated Nov. 3, 2015", 13 pgs.
"U.S. Appl. No. 14/562,524, First Action Interview Pre-Interview Communication dated Sep. 24, 2015", 12 pgs.
"U.S. Appl. No. 14/562,524, First Action Interview Pre-Interview Communication dated Nov. 10, 2015", 6 pgs.
"U.S. Appl. No. 14/571,098, Final Office Action dated Feb. 23, 2016", 37 pgs.
"U.S. Appl. No. 14/571,098, First Action Interview dated Aug. 24, 2015", 4 pgs.
"U.S. Appl. No. 14/571,098, First Action Interview Pre-Interview Communication dated Mar. 11, 2015", 4 pgs.
"U.S. Appl. No. 14/571,098, First Action Interview Pre-Interview Communication dated Aug. 5, 2015", 4 pgs.
"U.S. Appl. No. 14/571,098, First Action Interview Pre-Interview Communication dated Nov. 10, 2015", 5 pgs.
"U.S. Appl. No. 14/631,633, First Action Interview Pre-Interview Communication dated Sep. 10, 2015", 5 pgs.
"U.S. Appl. No. 14/676,621, Examiner Interview Summary dated Jul. 30, 2015", 5 pgs.
"U.S. Appl. No. 14/676,621, Final Office Action dated Oct. 29, 2015", 10 pgs.
"U.S. Appl. No. 14/746,671, First Action Interview Pre-Interview Communication dated Nov. 12, 2015", 19 pgs.
"U.S. Appl. No. 14/746,671, Notice of Allowance dated Jan. 21, 2016", 7 pgs.
"U.S. Appl. No. 14/800,447, First Action Interview Pre-Interview Communication dated Dec. 10, 2015", 26 pgs.
"U.S. Appl. No. 14/813,749, Final Office Action dated Apr. 8, 2016", 80 pgs.
"U.S. Appl. No. 14/813,749, Non Final Office Action dated Sep. 28, 2015", 22 pgs.
"U.S. Appl. No. 14/842,734, First Action Interview Pre-Interview Communication dated Nov. 19, 2015", 17 pgs.
"U.S. Appl. No. 14/858,647, Notice of Allowance dated Mar. 4, 2016", 47 pgs.
"U.S. Appl. No. 14/929,584, Final Office Action dated May 25, 2016", 42 pgs.
"U.S. Appl. No. 14/929,584, Non Final Office Action dated Feb. 4, 2016", 15 pgs.
"Apsalar—Mobile App Analytics & Advertising", https://apsalar.com/, (Jul. 18, 2013), 1-8.
"Beta Testing on the Fly", TestFlight, [Online]. Retrieved from the Internet: <URL: https://testflightapp. com/>, (Accessed: Jul. 18, 2013), 3 pgs.
"Countly", Countly Mobile Analytics, [Online]. Retrieved from the Internet: <URL: http://count.ly/products/screenshots, (accessed Jul. 18, 2013), 9 pgs.
"Distimo—App Analytics", [Online]. Retrieved from the Internet: <URL: http://www.distimo.com/app-analytics, (accessed Jul. 18, 2013), 5 pgs.
"European Application Serial No. 14187996.5, Communication Pursuant to Article 94(3) EPC dated Feb. 19, 2016", 9 pgs.
"European Application Serial No. 14187996.5, Extended European Search Report dated Feb. 12, 2015", 7 pgs.
"European Application Serial No. 14191540.5, Extended European Search Report dated May 27, 2015", 9 pgs.
"European Application Serial No. 14200246.8, Extended European Search Report dated May 29, 2015", 8 pgs.
"European Application Serial No. 14200298.9, Extended European Search Report dated May 13, 2015", 7 pgs.
"European Application Serial No. 15181419.1, Extended European Search Report dated Sep. 29, 2015", 7 pgs.
"European Application Serial No. 15184764.7, Extended European Search Report dated Dec. 14, 2015", 8 pgs.
"European Application Serial No. 15200073.3, Extended European Search Report dated Mar. 30, 2016", 16 pgs.
"European Application Serial No. 15201924.6, Extended European Search Report dated Apr. 25, 2016", 8 pgs.
"European Application Serial No. 15202919.5, Extended European Search Report dated May 9, 2016", 13 pgs.
"European Application Serial No. 16152984.7, Extended European Search Report dated Mar. 24, 2016", 8 pgs.
"Flurry Analytics", [Online]. Retrieved from the Internet: <URL: http://www.flurry.com/, (accessed Jul. 18, 2013), 14 pgs.
"Google Analytics Official Website—Web Analytics & Reporting", [Online]. Retrieved from the Internet: <URL: http ://www.google.com/ analytics/index.html, (accessed Jul. 18, 2013), 22 pgs.
"Great Britain Application Serial No. 1404486.1, Combined Search Report and Examination Report dated Aug. 27, 2014", 5 pgs.
"Great Britain Application Serial No. 1404486.1, Office Action dated May 21, 2015", 2 pgs.
"Great Britain Application Serial No. 1404489.5, Combined Search Report and Examination Report dated Aug. 27, 2014", 5 pgs.
"Great Britain Application Serial No. 1404489.5, Office Action dated May 21, 2015", 3 pgs.

(56) References Cited

OTHER PUBLICATIONS

"Great Britain Application Serial No. 1404489.5, Office Action dated Oct. 6, 2014", 1 pgs.
"Great Britain Application Serial No. 1404499.4, Combined Search Report and Examination Report dated Aug. 20, 2014", 6 pgs.
"Great Britain Application Serial No. 1404499.4, Office Action dated Jun. 11, 2015", 5 pgs.
"Great Britain Application Serial No. 1404499.4, Office Action dated Sep. 29, 2014", 1 pg.
"Help File for ModelRisk Version 5—Part 1", Vose Software, (2007), 375 pgs.
"Help File for ModelRisk Version 5—Part 2", Vose Software, (2007), 362 pgs.
"Hunchlab: Heat Map and Kernel Density Calculation for Crime Analysis", Azavea Journal, [Online]. Retrieved from the Internet: <www.azavea.com/blogs/newsletter/v4i4/kernel-density-capabilities-added-to-hunchlab>, (Sep. 9, 2014), 2 pgs.
"KeyLines Datasheet", Keylines.com, [Online]. Retrieved from the Internet: <URL: http://keylines.com/wp-content/uploads/2014/03/KeyLines-datasheet.pdf>, (Mar. 2014), 2 pgs.
"Mixpanel: Actions speak louder than page views", Mobile Analytics, [Online]. Retrieved from the Internet: <URL: https://mixpanel.com/>, (Accessed: Jul. 18, 2013), 13 pgs.
"Mobile App Marketing & Analytics", Localytics, [Online]. Retrieved from the Internet: <URL: http://www.localytics.com/>, (Accessed: Jul. 18, 2013), 12 pgs.
"Mobile Web", Wikipedia:, [Online] retrieved from the internet:https://en.wikipedia.org/w/index.php?title=Mobile Web&oldid=643800164, (Jan. 23, 2015), 6 pgs.
"More than android analytics", UserMetrix, [Online]. Retrieved from the Internet: <URL: http://usermetrix.com/android-analytics>, (Accessed: Jul. 18, 2013), 3 pgs.
"More Than Mobile Analytics", Kontagent, [Online]. Retrieved from the Internet: <URL: http://www.kontagent.com/>, (Accessed: Jul. 18, 2013), 9 pgs.
"Multimap", Wikipedia, [Online]. Retrieved from the Internet: <URL: https://en.wikipedia.org/w/index.php?title=Multimap&oldid=530800748>, (Jan. 1, 2013), 2 pgs.
"Netherlands Application Serial No. 2012417, Netherlands Search Report dated Sep. 18, 2015", W/ English Translation, 9 pgs.
"Netherlands Application Serial No. 2012421, Netherlands Search Report dated Sep. 18, 2015", 8 pgs.
"Netherlands Application Serial No. 2012438, Search Report dated Sep. 21, 2015", 8 pgs.
"New Zealand Application Serial No. 622473, First Examination Report dated Mar. 27, 2014", 3 pgs.
"New Zealand Application Serial No. 622473, Office Action dated Jun. 19, 2014", 2 pgs.
"New Zealand Application Serial No. 622513, Office Action dated Apr. 3, 2014", 2 pgs.
"New Zealand Application Serial No. 628161, First Examination Report dated Aug. 25, 2014", 2 pgs.
"Piwik—Free Web Analytics Software", Piwik, [Online]. Retrieved from the Internet: <URL: http://piwik.org/>, (Accessed: Jul. 19, 2013), 18 pgs.
"Realtime Constant Customer Touchpoint", Capptain—Pilot your apps, [Online] retrieved from the internet: <http://www.capptain.com>, (accessed Jul. 18, 2013), 6 pgs.
"Refresh CSS ellipsis when resizing container", Stack Overflow, [Online]. Retrieved from the Internet: <URL: http://stackoverflow.com/questions/17964681/refresh-css-ellipsis-when-resizing-container>, (Accessed: May 18, 2015), 1 pg.
"SAP BusinessObjects Explorer Online Help", SAP BusinessObjects, (Mar. 19, 2012), 68 pgs.
"Visualizing Threats: Improved Cyber Security Through Network Visualization", Keylines.com, [Online] retrieved from the internet: <http:/ /keylines.com/wp-content/uploads/2014/04/Visualizing-Threats1.pdf>, (May 12, 2014), 10 pgs.
"Welcome to StatCounter—Visitor Analysis for Your Website", StatCounter, [Online]. Retrieved from the Internet: <URL: http://statcounter.com/>, (Accessed: Jul. 19, 2013), 17 pgs.
Andrew, G. Psaltis, "Streaming Data—Designing the real-time pipeline", vol. MEAP V03, (Jan. 16, 2015), 16 pgs.
Celik, T, "CSS Basic User Interface Module Level 3 (CSS3 UI)", Section 8; Resizing and Overflow, [Online] retrieved from the internet: <http://www.w3.org/TR/2012/WD-css3-ui-20120117/#resizing-amp-overflow>, (Jan. 17, 2012), 1-58.
Chaudhuri, Surajit, et al., "An Overview of Business Intelligence Technology", Communications of the ACM, vol. 54, No. 8., (Aug. 2011), 88-98.
Cohn, David, et al., "Semi-supervised Clustering with User Feedback", Cornell University, (2003), 9 pgs.
Gill, Leicester, et al., "Computerised linking of medical methodological guidelines", 3rournal of Epidemiolog and Coimmunity Health 47, (1993), pp. 316-319.
Gorr, et al., "Crime Hot Spot Forecasting: Modeling and Comparative Evaluation", Grant 98-IJ-CX-K005, (May 6, 2002), 37 pgs.
Gu, Lifang, et al., "Record Linkage: Current Practice and Future Directions", (Jan. 15, 2004), 32 pgs.
Hansen, D., et al., "Analyzing Social Media Networks with NodeXL: Insights from a Connected World", Chapter 4, pp. 53-67 and Chapter 10, pp. 143-164,, (Sep. 2010), 53-67; 143-164.
Hua, Yu, et al., "A Multi-attribute Data Structure with Parallel Bloom Filters for Network Services", HiPC 2006, LNCS 4297, (2006), 277-288.
Jan-Keno, Janssen, "Wo bist'n du?—Googles Geodienst Latitude", Not in English, [Online] retrieved from the internet:http://www.heise.de/artikel-archiv/ct/2011/03/086/@00250@/ct.11.03.086-088.pdf, (Jan. 17, 2011), 86-88.
Manno, et al., "Introducing Collaboration in Single-user Applications through the Centralized Control Architecture", (2010), 10 pgs.
Phillip, J Windley, "The Live Web: Building Event-Based Connections in the Cloud", Course Technology PTR, (Dec. 21, 2011), 61 pgs.
Sigrist, Christian, et al., "Prosite, a Protein Domain Database for Functional Characterization and Annotation", Nucleic Acids Research, vol. 38, (2010), D161-D166.
Valentini, Giorgio, et al., "Ensembles of Learning Machines", Lecture Notes in Computer Science: Neural Nets, Springer Berlin Heidelberg, (Sep. 26, 2002), 3-20.
Wang, Guohua, et al., "Research on a Clustering Data De-Duplication Mechanism Based on Bloom Filter", IEEE, (2010), 5 pgs.
Winkler, William E, et al., "Record Linkage Software and Methods for Merging Administrative Lists", Bureau of the Census Statistical Research Division : Statistical Research Report Series, No. RR2001/03, (Jul. 23, 2001), 11 pgs.

\* cited by examiner

US 10,706,056 B1

AUDIT LOG REPORT GENERATOR

CROSS-REFERENCE TO RELATED APPLICATIONS

This application claims the benefit of U.S. Provisional Application No. 62/262,327, filed Dec. 2, 2015, which is incorporated by reference herein in its entirety.

TECHNICAL FIELD

The present application relates generally to the technical field of user interface generation and customization, and, in one specific example, to generating a supplemental user interface at a client system to serve as a basis for an audit log report that is to be generated by the entity in response to a detection of a pattern of potential criminal activity in data objects maintained by the entity.

BACKGROUND

An enterprise knowledgebase platform may include applications for integrating data items from multiple disparate data sources, such as audit logs, web server logs, and network traffic logs into a data object model for collective analysis.

An anti-fraud solution may extend the enterprise knowledgebase platform to assist an entity (e.g., a commercial enterprise or a government organization) in detecting criminal activity, such as credit card bust out fraud, money laundering, check kiting, mortgage fraud, tax fraud, tax evasion, and synthetic identify fraud.

An audit log (or audit trail) is a chronological set of records that provide documentary evidence of a sequence of activities, such as activities pertaining to financial transactions, scientific research transactions, health care data transactions, or communications between entities (e.g., people systems, or accounts).

BRIEF DESCRIPTION OF THE DRAWINGS

Some embodiments are illustrated by way of example and not limitation in the figures of the accompanying drawings.

DETAILED DESCRIPTION

Figure 1:
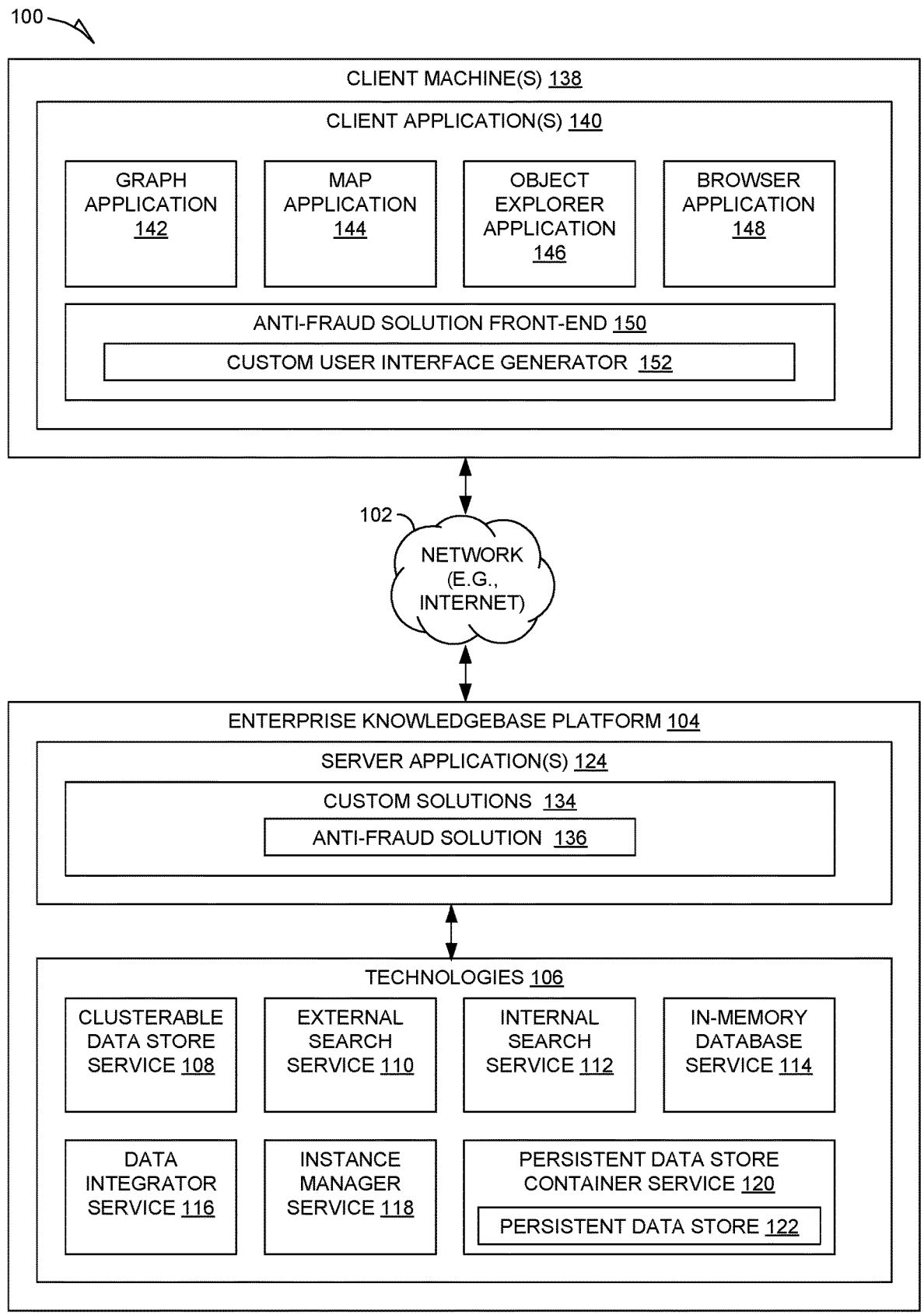
FIG. 1 is a network diagram depicting a system within which various example embodiments described herein may be deployed.

In the following description, for purposes of explanation, numerous specific details are set forth in order to provide an understanding of various embodiments of the present subject matter. It will be evident, however, to those skilled in the art that various embodiments may be practiced without these specific details.

An entity, such as a financial institution, may be tasked with implementing fraud detection, prevention, or response efforts (e.g., to comply with various laws and regulations, such as anti-money-laundering, anti-corruption, or anti-bribery laws and regulations).

To assist with these efforts, the entity may deploy a knowledgebase enterprise platform, such as Gotham Palantir. Additionally, the entity may extend the knowledgebase enterprise platform with an anti-fraud solution, such as Palantir Anti-Fraud, to assist in processing data objects maintained in the knowledgebase enterprise platform for the specific purpose of identifying and eradicating patterns of fraudulent activity.

For example, a user of a client system having access to the knowledgebase enterprise platform or anti-fraud solution may be presented with a notification (e.g., in a user interface of a front-end application executing on the client system) of an alert pertaining to suspicious activity that has been identified (e.g., an activity that may be indicative of criminal activity). The user (e.g., a level 1 analyst of the entity) may then be tasked with determining whether the alert should be dismissed or escalated for further investigation. The user may be further tasked with providing an audit log report that may serve as a record of the entity's due diligence with respect to an investigation of the alert.

To perform such tasks, the user may use a front-end application executing on the client system to access various applications of the enterprise management platform or anti-fraud solution, such as a graph tool for visually exploring semantic relationships between data objects, a map tool for performing geospatial analysis of the data objects, or an object explorer tool for drilling down on objects of interest within massive datasets.

As part of an investigative workflow, the user may perform various investigative steps with respect to the alert, such as Know Your Customer (KYC) and Know Your Customer's Customer (KYCC) due diligence. For example, for a customer that is the subject of the alert, the user may investigate related customers, past alerts, past cases, the customer's bank accounts, related transactions, counterparty bank accounts, and counterparties.

Depending on various factors, such as a type of the alert, the user (or other users associated with the entity) may use the various applications to repeatedly perform a similar series of investigative steps. For example, these investigative steps may include repeatedly triggering requests for processing of a particular set of database queries and subsequently presenting corresponding query results in various primary user interfaces of the front-end application executing on the client system.

In various embodiments, database queries specified in a first database query language (e.g., a front-end database query language) may be included into a template for generating a supplementary user interface for the front-end application executing on the client system. Additionally, instructions may be included in the template for presenting data items derived from query results corresponding to the queries in custom data fields of the supplementary user interface. The supplementary user interface may be integrated into a primary user interface of the application executing on the client system. Thus, the user may access the supplementary user interface to more quickly complete investigative steps pertaining to an alert and more easily view relevant data than if the user performed the steps using the primary user interface.

In various embodiments, alerts of suspicious activity may be received from the enterprise management platform (e.g., via the anti-fraud solution) at the front-end application executing on the client system. The front-end application may generate a primary user interface for presenting notifications corresponding to the alerts to the user. The user may then choose to access a supplementary user interface corresponding to the alert (e.g., by clicking on the notification of the alert within the primary user interface).

A plug-in (e.g., an audit log helper tool or a custom user interface generator) may select a template for a supplementary user interface from a set of predesigned templates based on various factors, such as the alert type. In various embodiments, these alert types are based on the detection scenarios that triggered them. Detection scenarios include scenarios based on daily, weekly, monthly patterns, such as exceeding certain transaction amount thresholds over different time periods.

The plug-in may transform the queries included in the template and specified in the first query language into queries specified in a second query language (e.g., a back-end query language for an in-memory database maintained by a back-end technology of the enterprise knowledgebase platform). In various embodiments, the transformation process may include consolidating two or more queries specified in the first query language into one query of the second query language.

Thus, in various embodiments, the first query language may be a user-friendly query language that may be used (e.g., by a client application developer) to quickly and easily generate queries corresponding to custom data views comprising the supplemental user interface. In contrast, the second query language may not be as user-friendly as the first query language, but it may be more efficient (e.g., use less processing power, bandwidth, or memory) than the first query language or have better performance (e.g., access an in-memory database service to process the queries).

The plug-in may send the transformed queries to the enterprise management platform for processing.

When the results of the transformed queries are received at the front-end application executing on the client system, the plug-in may then reverse the transformation process by, for example, transforming the query results corresponding to the second query language into query results corresponding to the first query language.

Additionally, the plug-in may handle derivation of data items from the query results for presentation in one or more custom data views based on instructions included in the template for laying out in the supplementary user interface.

Upon being presented with the retrieved and consolidated data in the custom views of the supplementary user interface, the user may be able to more quickly make the determination of whether to escalate the alert for further investigation than if the user had performed the investigative steps manually and viewed the relevant data items within the primary user interface. Additionally, the user may use the supplementary user interface as a basis for generating an audit log report showing the results of the investigation of the user. For example, the plug-in may allow the user to output the data items, along with any additional findings, recommendations, or remarks of the user, as a record that may establish due diligence by the entity with respect to the alert.

In various embodiments, a method is disclosed for generating a supplemental user interface to supplement a primary user interface of an application executing on a client system. The supplemental user interface is based on a template that includes database queries specified in a front-end query language and instructions for presenting data items derived from query results corresponding to the database queries specified in the front-end query language in the supplementary user interface.

In various embodiments, at the client system, an alert is received from a server system. The alert identifies a suspicious activity that is to be reviewed by a user of the client system. A template for the supplementary user interface is accessed. The database queries specified in the front-end query language are translated into database queries specified in a back-end query language. The database queries specified in the back-end query language are communicated to the server system. Query results corresponding to the database queries specified in the back-end query language are received. The query results corresponding to the database queries specified in the back-end query language are translated into query results corresponding to the database queries specified in the front-end query language. The data items derived from the query results corresponding to the database queries specified in the front-end query language are presented in the supplementary user interface based on the instructions included in the template.

In various embodiments, at the client system, a request is received to investigate an alert received from a server system. A template for a supplementary user interface pertaining to the investigation is accessed. The template associates database queries specified in a front-end query language (e.g., a query language that is non-native to the server) with a set of fields included in the supplementary user interface. Some of the database queries corresponding to the fields of the supplementary user interface may be replaced automatically with database queries specified in a back-end query language (e.g., a query language that is native to the server). The database queries specified in the back-end query language may be selected from sets of database queries specified in a back-end based on various factors, such as information pertaining to anticipated changes to the fields of the supplementary user interface. In various embodiments, the sets of database queries specified in the back-end query language may have been previously translated from corresponding queries specified in the front-end query language and stored in a database for the selection.

The database queries are transmitted to the server for processing. Data corresponding to the database queries is received. Data corresponding to the queries specified in the back-end query language is translated into data corresponding to queries specified in the front-end query language. In various embodiments, it is confirmed that data corresponding to each of the fields on the supplementary user interface was successfully received and, if necessary, derived from the results corresponding to the translated database queries. An audit log report is generated that includes the returned data included in the supplementary user interface.

In various embodiments, a method of generating a user interface is disclosed. At a client system, it is detected that an alert identifying a suspicious activity that is to be reviewed by a user of the client system has been received. A template for a user interface is accessed. The template includes database queries and instructions for presenting data items derived from query results corresponding to the database queries in the user interface. The instructions include a mapping of the data items to data fields of the user interface. Data items derived from the query results are presented in the user interface based on the instructions included in the template. An audit log is updated based on an acceptance by the user of the data items presented in the user interface.

A computer system having one or more modules (e.g., hardware modules or software modules) may be configured to perform operations corresponding to this method and any of the other embodiments described herein. Operations corresponding to this method and the other embodiments may be embodied as instructions stored on a machine-readable medium that, when executed by at least one processor of a machine, cause the at least one processor to perform the operations.

FIG. 1 is a network diagram depicting a system 100 within which various example embodiments may be deployed. An enterprise knowledgebase platform 104 provides server-side functionality, via a network 102 (e.g., the Internet or Wide Area Network (WAN)) to one or more clients machines 138. FIG. 1 illustrates client application(s) 140 on the client machines 138. Examples of client application(s) 140 may include a web browser application, such as the Internet Explorer browser developed by Microsoft Corporation of Redmond, Wash. or other application supported by an operating system of the device, such as Windows, iOS or Android operating systems. Each of the client application(s) 140 may include a software application module (e.g., a plug-in, add-in, or macro) that adds a specific service or feature to the application. For example, the client application(s) 140 may include a custom user interface generator '41, which is described in more detail below.

An API server and a web server may be coupled to, and provide programmatic and web interfaces respectively to, one or more application servers. The application servers may host one or more server application(s) 124. The application servers are, in turn, be coupled to one or more database servers that facilitate access to one or more databases or data stores, such as NoSQL or non-relational data stores.

The server applications 124 may provide a number of functions and services to users that access the enterprise knowledgebase platform 104. While the server applications 124 are shown in FIG. 1 to form part of the enterprise knowledgebase platform 104, in alternative embodiments, the various server applications 124 may form part of a service that is separate and distinct from the enterprise knowledgebase platform 104.

Further, while the system 100 shown in FIG. 1 employs a client-server architecture, various embodiments are, of course, not limited to such an architecture, and could equally well find application in a distributed, or peer-to-peer, architecture system, for example. The various server applications 124 could also be implemented as standalone software programs, which do not necessarily have networking capabilities. Additionally, although FIG. 1 depicts client machines 138 as being coupled to a single enterprise knowledgebase platform 104, it will be readily apparent to one skilled in the art that client machines 138, as well as client applications 140, may be coupled to multiple networked systems, such as multiple distributed instances of the enterprise knowledgebase platform 104.

The server applications 124 of the enterprise knowledgebase platform 104 may be built on many different technologies 106 of the enterprise knowledgebase platform 104. In various embodiments, these technologies 106 may be exposed (e.g., via APIs) as one or more services to the server applications 124.

A clusterable data store service 108 may support very fast (e.g., sub-second) query results against a massive database (e.g., trillions of records at a petabyte scale) and performing advanced analytics against the data.

An external search service 110 may provide in-place federated searching of external data sources. The external search service 110 may integrate data from external searches on the fly into meaningfully defined objects and relationships (e.g., via a data integrator service 116) and store the integrated data (e.g., in a persistent data store 122).

An internal search service 112 may provide support for querying (e.g., full-text querying) across all data maintained by the enterprise knowledgebase platform 104, including structured and unstructured data.

An in-memory database service 114 may support fast (e.g., 10-second) query results against a large in-memory database (e.g., billions of in-memory records).

The data integrator service 116 may transform and integrate data items from multiple sources from their raw storage formats into data objects and associated properties that represent real objects in the world (e.g., people, places, things, events, and the connections between them). The data objects may be maintained as an ontology that is customized for an entity based on how the entity conceives of the world. The ontology may be dynamically updated as new data sources are added or removed or based on a reconceptualization of the underlying object model by the entity.

A persistent data store container service 120 may serve as a data storage container for the persistent data store 122. The persistent data store container service 120 may combine the simplicity and scalability of modern distributed NoSQL data stores with the transactional safety and consistency of traditional SQL databases. The persistent data store container service may layer ACID-compliant transactions on top of a key-value store. The persistent data store container service 120 may support a portable and pluggable transaction API that may scale up to data-center scale or down to laptop scale with a linear price/performance curve.

The persistent data store 122 may support access control, auditing, knowledge management, and collaboration features. The data in the persistent data store 122 may be accompanied by a history of its lineage, including when it was created or modified, who created or modified it, the data source from which it was derived, and security or access restrictions associated with the data. This metadata may be accessed by a client system, providing a context-rich analytic experience for users and enabling secure collaboration between users with different access permissions or users pursuing different analytic lines of reasoning. The metadata, security controls, and version control capabilities may allow different users to interact with different views of a given data object at any given time while maintaining data integrity.

An instance manager service 118 may support implementation of the enterprise knowledgebase platform 104 as a distributed system. In various embodiments, the enterprise knowledgebase platform 104 is a distributed system of distributed systems. Each instance of the enterprise knowledgebase platform 104 may maintain its own "nexus" of data in the persistent data store 122. A nexus may incorporate data and analysis from another instance of the enterprise knowledgebase platform 104 (e.g., through an act of synchronization, or "peering"). With the help of vector clocked layered on top of the persistent data store 122, the instance manager service 118 may capture, circulate, and merge changes to data shared across instances of the enterprise knowledgebase platform 104. Conflicting changes that cannot be resolved automatically may be queued up for human review and resolution in a graphical user interface. The instance manager service 118 may account for multiple dynamic ontologies and multiple access control regimes while ensuring that data is always in a consistent state across instances. Thus, in various embodiments, the instance manager service 118 enables users across organizational, functional, and geographic boundaries to securely share and collaboratively analyze data.

The server application(s) 124 may expose one or more functionalities of the enterprise knowledgebase platform 104 to the client application(s) 140. In various embodiments, the server application(s) 124 include one or more custom solutions 134, which are sets of the server application(s) 124 that are customized for a particular entity, industry, or problem space.

An anti-fraud solution 136 may be configured to fuse data from multiple sources, such as transactions, weblogs, network traffic, and other dense, low-signal, disparate data accessible to an entity into a coherent object model, allowing analysts to ask questions in the language of the entities, events, and relationships, not data primitives.

In various embodiments the anti-fraud solution 136 may allow human experts to look across their entire universe of data to find novel patterns of suspicious activity. For example, investigators at commercial enterprises have the contextual knowledge to know where to look for unique strains of fraud, such as money laundering, check kiting, or complex, synthetic identity fraud across lines of business. Tax authorities have the experience and domain expertise to develop hypotheses about new forms of tax fraud, illegal transfer pricing, and other forms of tax evasion. The anti-fraud solution 136 enables these domain experts to interact with the data in ways explicitly designed for fighting fraud.

Once an analyst has identified and characterized a new pattern of fraudulent behavior, the anti-fraud solution 136 is configured to quickly recognize all cases that conform to that pattern, enabling managers to take swift action to eliminate the threat. Analysts can build new rules around complex attributes or behaviors that they have discovered in the course of their investigations. The anti-fraud solution 136 can then run clustering algorithms persistently against the data to identify criminal behavior at massive scale, effectively creating a resistance within the enterprise to particular strains of fraud or crime.

On the front end, the client application(s) 140 may provide a suite of integrated tools optimized for semantic, temporal, geospatial, and full-text analysis. In various embodiments, users can drag and drop data objects from one application to the next for a frictionless, multi-faceted analytic experience.

A graph application 142 may provide a way to visually explore the semantic relationships between data objects. The objects may be represented visually as networks of nodes and edges. Filtering tools may allow users to drill down on interesting objects. The graph application 142 may include a timeline for visualizing the sequencing of events and a time wheel to understand the periodicity and frequency of repeating events. An integrated histogram may help with selection and filtering of objects that have similar properties, like the same address, phone number, city, or domain name. The graph application 142 may also include a way to visualize how communications, payments, shipments, and other data move through a network. In various embodiments, users can adjust the layout of the nodes and edges of the graph to visualize different network characteristics, like hierarchical relationships. A suite of presentation tools included in the graph application 142 may allow users to annotate and enhance the graphs for use in presentations.

A map application 144 may provide geospatial analytic capabilities. For example, the map application 144 may combine the visualization of geo-located objects on a map with histogram, timeline, and time wheel visualizations. A heatmap visualization may illuminate the density of interesting objects on the map. The imagery on the map may be fully pluggable, allowing users to switch between different sources of imagery, integrate private imagery, and create composite imagery sets that combine two or more sources of imagery. For example, files (e.g., KML and Shapefiles) can be imported as independent map layers, and shapes contained in these layers can be used to select and filter objects that lie in a similar region (like a county, census plot, or state). Layers can be colored and labeled according to calculations performed on the data they contain.

An object explorer application 146 may allow users to drill down on objects of interest within massive datasets. For example, the object explorer application 146 may enable users to define and apply a sequence of filters over billions of data objects (e.g., using the in-memory database service 114) to arrive at interesting sub-sets of data for further analysis in other applications, like the graph application 142 or the map application 144.

A browser application 148 may allow users to view and apply structure to unstructured documents. For example, as a user reads raw text, the browser application 148 may allow the user to "tag" particular words, thereby associating a document with a particular object or objects in the ontology and making this data available for analysis in other applications.

An anti-fraud solution front-end application 150 may provide a user interface for the anti-fraud solution 136. The user interface may, for example, generate notifications of alerts of potential criminal activity that are received from the anti-fraud solution 136.

A custom user interface generator 152 may be configured to generate a custom user interface for the anti-fraud solution front-end 150. The custom user interface may be generated from a template that defines database queries associated with the custom user interface and maps database query results to data fields of the custom user interface, as described in more detail below.

In various embodiments, the client application(s) 140 may be implemented as mobile applications. Thus, the reach of the enterprise knowledgebase platform 104 may be extended into the field for real-time, distributed operations that require collaboration and data collection in highly-fluid situations, like post-disaster humanitarian response and coordinated law enforcement operations. The mobile applications may enable real-time coordination between field operations and users at base states. For example, users may be able to use their mobile client devices to file field reports, upload photos and video, track the locations of their teammates, or search and explore data integrated into the enterprise knowledgebase platform 104.

Figure 2:
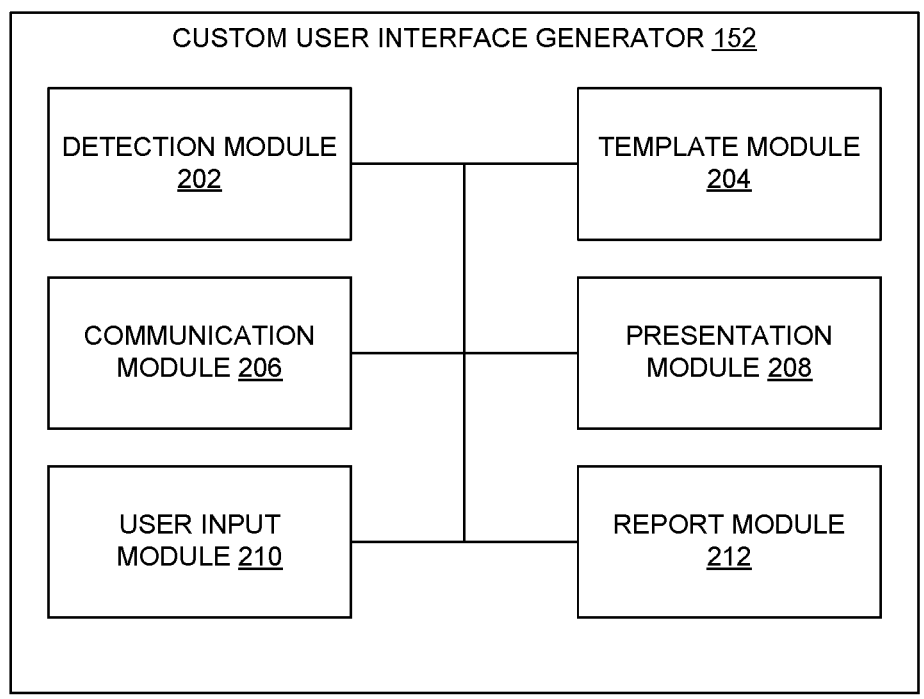
FIG. 2 is a block diagram illustrating modules of the custom user interface generator of FIG. 1.

FIG. 2 is a block diagram illustrating example modules of the custom user interface generator 152. In various embodiments, the custom user interface generator 152 may be a plug-in for the anti-fraud solution front-end 150. A detection module 202 may be configured to detect that a user of the anti-fraud solution front-end has requested generation of a supplemental user interface corresponding to a notification of an alert that has been received by the anti-fraud solution front-end 150 from the anti-fraud solution 136.

A template module 204 may be configured to select and access a template corresponding to the notification (e.g., based on a type of the notification). In various embodiments, the template includes a set of database queries specified in a front-end database query language. The template also includes mappings of database query results corresponding to the database queries to data fields of a supplemental user interface. The template also includes instructions (e.g., HTML instructions) for presenting the layout of the data fields within the supplemental user interface.

A communication module 206 may be configured to transmit translated database queries and untranslated database queries to the enterprise management platform for processing and receive the database query results corresponding to the database queries.

A presentation module 208 may be configured to derive data items from the database query results and map them to data fields of the custom user interface based on instructions included in the template. Additionally, the presentation module 208 may layout the data items within the custom user interface based on instructions included in the template.

A user input module 210 may be configured to automatically enter user input on behalf of the administrator into a front-end user interface to specify information pertaining to investigations that the administrator performs in response to receiving the notification of the alert. Thus, for example, the administrator may use plug-in to access a supplementary user interface for collecting data from the server specific to the investigation of the alert. The user input module may then automatically fill in fields in the anti-fraud solution front end to show that the administrator has completed a mandatory investigation pertaining to the alert.

A report module 212 may be configured to allow a user to generate an audit log report based on the custom user interface, as described in more detail below.

In various embodiments, the modules 202-212 may access a separate translation module. The translation module may be configured to translate the database queries specified in the front-end query language into database queries specified in a back-end query language. In various embodiments, the translation module may selectively translate a subset of the database queries based on an analysis of anticipated efficiency or performance gains that are to be realized as a result of the translation. The translation module may consolidate multiple database queries specified in the front-end query language to fewer database queries specified in the back-end language. In various embodiments, the translation module may use a combination of proprietary query languages, such as a proprietary back-end query language and a proprietary front-end query language. The proprietary front-end query language may offer a flexible way of describing database queries and these queries are translated to database specific queries. The proprietary back-end query language, on the other hand, may be native to a particular database (e.g., database query language, format, protocol) and therefore perform much faster than the proprietary front-end query language. Decisions may be made to place certain queries in the front-end query language) and others in the back-end query language, depending on the performance gains and information pertaining to foreseeable changes (e.g., extent of the changes, number of changes, and so on). In various embodiments, parts of a query that a more likely to change are not optimized into proprietary back-end query language. The translation module may translate query results corresponding to the database queries specified in the back-end query language into query results corresponding to the database queries specified in the front-end query language.

Figure 3:
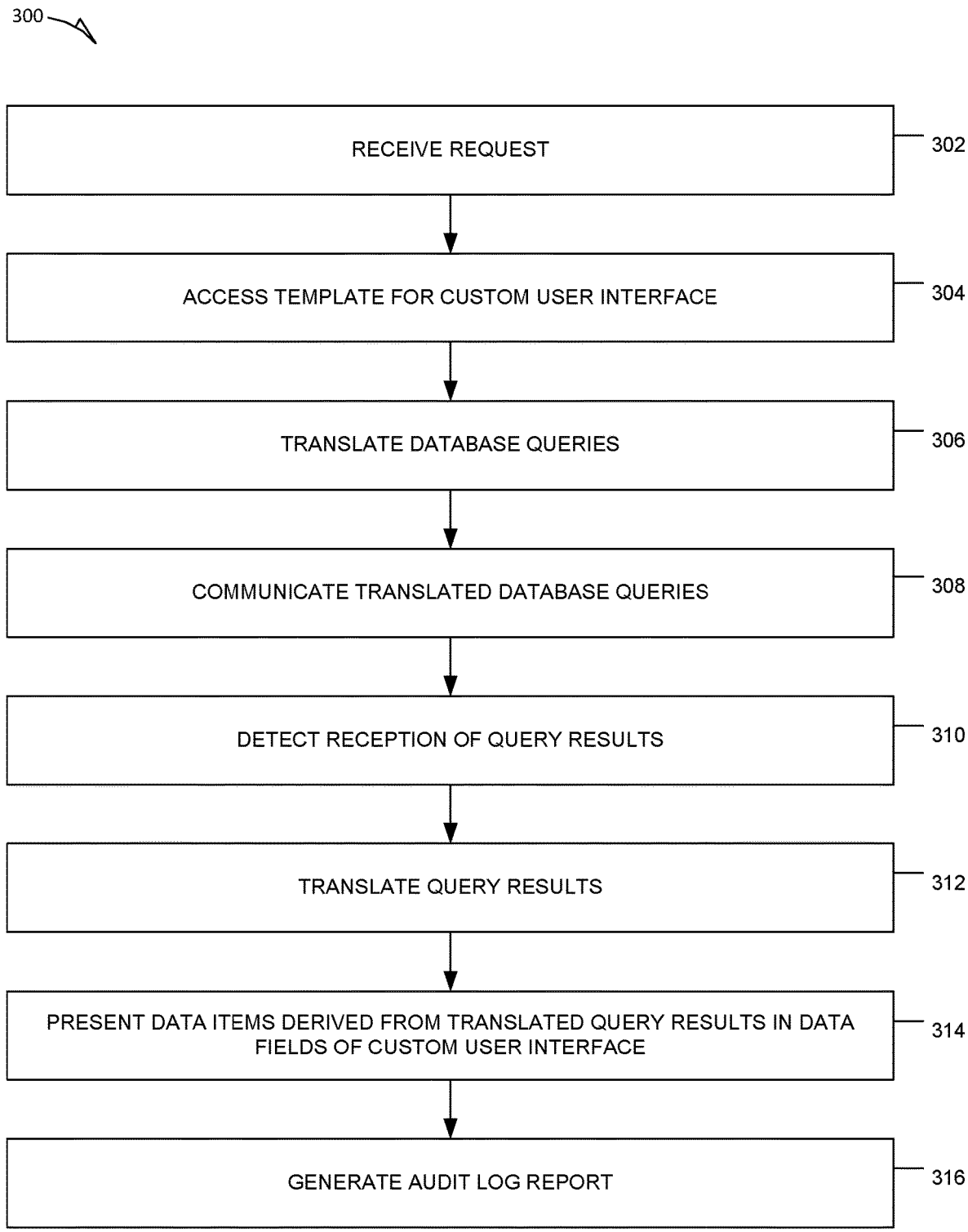
FIG. 3 is a flowchart illustrating example operations of a method of generating a custom user interface and an audit log report based on the custom user interface.

FIG. 3 is a flowchart illustrating example operations of a method 300 of generating a custom user interface and an audit log report based on the custom user interface. In various embodiments, the operations may be performed by one or more modules of custom user interface generator 152.

At operation 302, the detection module 202 detects that a user of a client system has requested generation of a custom supplementary user interface corresponding to an alert that has been received by the client system. In various embodiments, the alert signifies a detection by the anti-fraud solution 136 of potential criminal activity. For example, the alert may indicate that a pattern of activity represented in a universe of data objects derived from the multiple disparate data sources maintained by the enterprise knowledgebase platform 104 corresponds to a pattern of suspicious activity previously identified by human experts. The alert may be received by the client system and presented within a primary user interface of the anti-fraud solution front-end 150. The user of the client system may trigger the generation of the supplementary user interface (e.g., by clicking on a user interface element corresponding to the notification of the alert).

At operation 304, the template module 204 accesses a template for a custom supplementary user interface corresponding to the alert (e.g., based on a type of the alert). In various embodiment, the template includes multiple database queries specified in a front-end query language, instructions for presenting data items in custom data fields of the supplementary user interface, and mappings of data items derived from database query results corresponding to the database queries to the data fields.

At operation 306, the translation module 206 determines for each database query included in the template whether to use a database query specified in the front-end query language or a database query translated from the front-end query language into the back-end query language. In various embodiments, the queries are selected from sets of queries that have been written in a way to trade-off expressiveness versus performance. In various embodiments, queries were left in the more expressive language based on information pertaining to anticipated changes. In various embodiments, the determination may be made based on an analysis of anticipated efficiency or performance gains from performing the translation (e.g., whether the translation will lead to improvements in processing time of the database queries). Additionally, the translation module 206 may consolidate one or more of the database queries specified in the front-end query language to a few number of database queries specified in the front-end query language or the back-end query language. For example, if multiple database queries specified in the template can be combined into a single query without differences in the query results, the database queries may be combined.

This query, which is terse and highly expressive, is translated to native, lower-level database (e.g., back-end) queries which are necessarily more verbose and specific.

At operation 308, the communication module 308 communicates the database queries, including translated and non-translated database queries or consolidated database queries, to the enterprise knowledgebase platform 104 for processing. In various embodiments, as part of a plug-in architecture of the anti-fraud solutions front-end 150, the communication module 208 intercepts a set of messages generated by the anti-fraud solutions front-end 150 containing requests for processing of the untranslated database queries specified in the template and replaces the intercepted messages with a set of messages containing requests to process the newly determined set of database queries.

At operation 310, the communication module 208 detects that the anti-fraud solution front-end 150 has received query results corresponding to the database queries.

At operation 312, the translation module 206 reverses the translation performed at operation 306 with respect to the query results. For example, the translation module 206 translates the database query results corresponding to the back-end database query language into database query results corresponding to the front-end database query language.

At operation 314, the presentation module 310 presents data items derived from the translated query results in data fields of the custom supplementary user interface in accordance with the instructions include in the template for the custom user interface.

At operation 316, the report module 312 generates an audit log report based on the custom supplementary user interface for communication to the enterprise knowledgebase platform 104 for storage. In various embodiments, the generation of the audit log report may be automatic or it may be based on detection of a request to generate the audit log report from a user of the client system.

Figure 4:
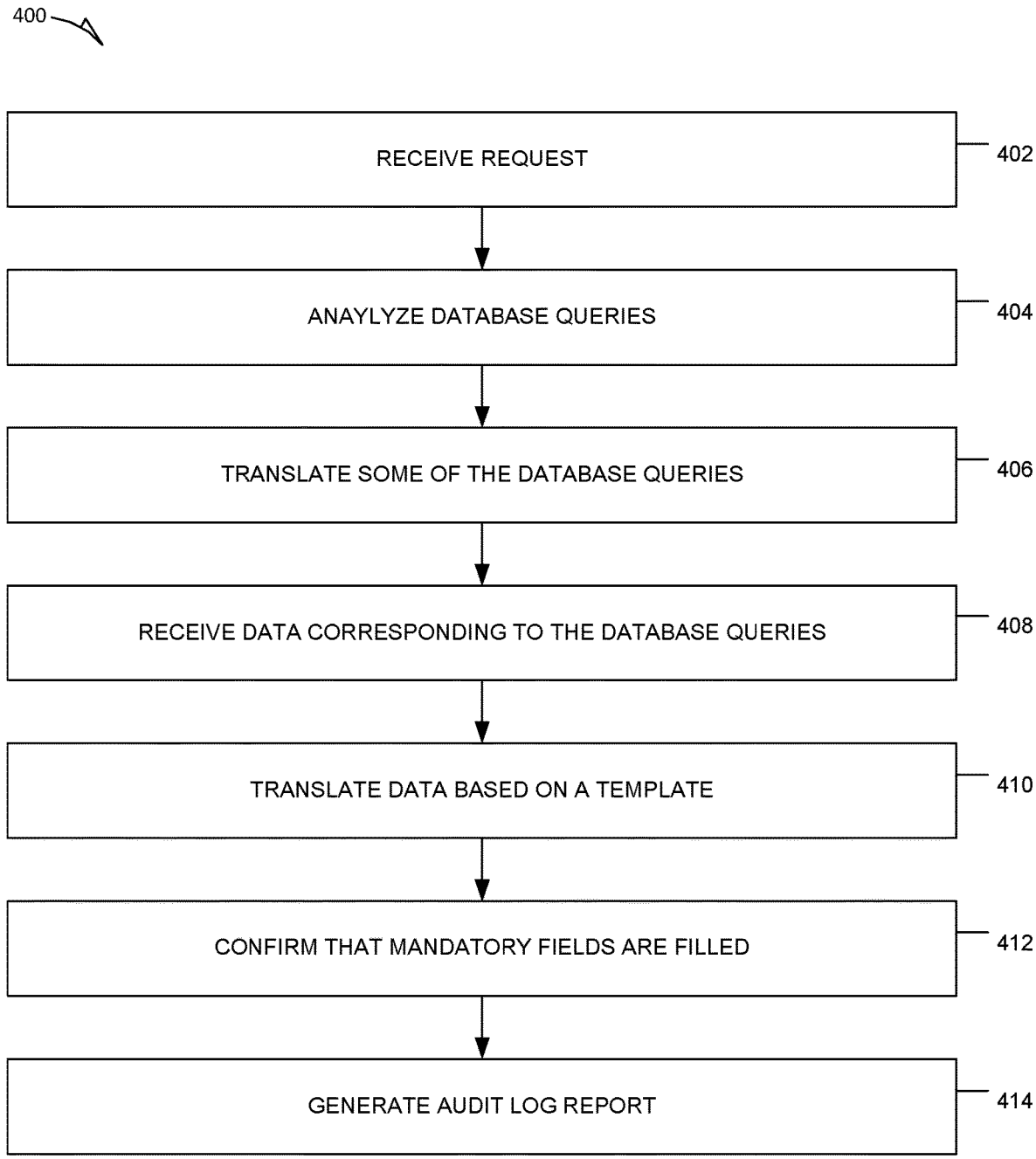
FIG. 4 is a flowchart illustrating example operations of an additional method of generating a custom user interface and an audit log report based on the custom user interface.

FIG. 4 is a flowchart illustrating example operations of an additional method 400 of generating a custom user interface and an audit log report based on the custom user interface. In various embodiments, the operations may be performed by one or more modules of custom user interface generator 152.

At operation 402, a request is received to investigate an alert received from a server system.

At operation 404, a template for a supplementary user interface pertaining to the investigation is accessed. The template associates database queries specified in a front-end query language (e.g., a query language that is non-native to the server) with a set of fields included in the supplementary user interface.

At operation 406, some of the database queries corresponding to the fields of the supplementary user interface may be replaced automatically with database queries specified in a back-end query language (e.g., a query language that is native to the server). The database queries specified in the back-end query language may be selected from sets of database queries specified in a back-end based on various factors, such as information pertaining to anticipated changes to the fields of the supplementary user interface. In various embodiments, the sets of database queries specified in the back-end query language may have been previously translated from corresponding queries specified in the front-end query language and stored in a database for the selection. In various embodiments, such translation is performed as described above with respect to FIG. 3. The database queries, including any database queries specified in the back-end query language that were selected to replace queries specified in the front-end query language, are transmitted to the server for processing.

At operation 408, data corresponding to the database queries is received.

At operation 410, data corresponding to the queries specified in the back-end query language is translated into data corresponding to queries specified in the front-end query language (e.g., as described above with respect to FIG. 3).

At operation 412, it is confirmed that data corresponding to each of the fields on the supplementary user interface was successfully received and, if necessary, derived from the results corresponding to the translated database queries. Additionally, fields corresponding to the alert that specify actions taken by the administrator to investigate the query may be automatically populated with information corresponding to the fields in the supplementary user interface. Thus, for example, actions that the administrator must mandatorily take in response to the receiving of the alert may be handled automatically on behalf of the administrator. For example, the supplementary user interface may gather necessary data for investigation of the alert and fields corresponding to the alert response may then be automatically filled in to specify that the administrator performed the necessary investigation.

At operation 414, an audit log report is generated that includes the returned data included in the supplementary user interface (e.g., as described above with respect to FIG. 3).

Figure 5:
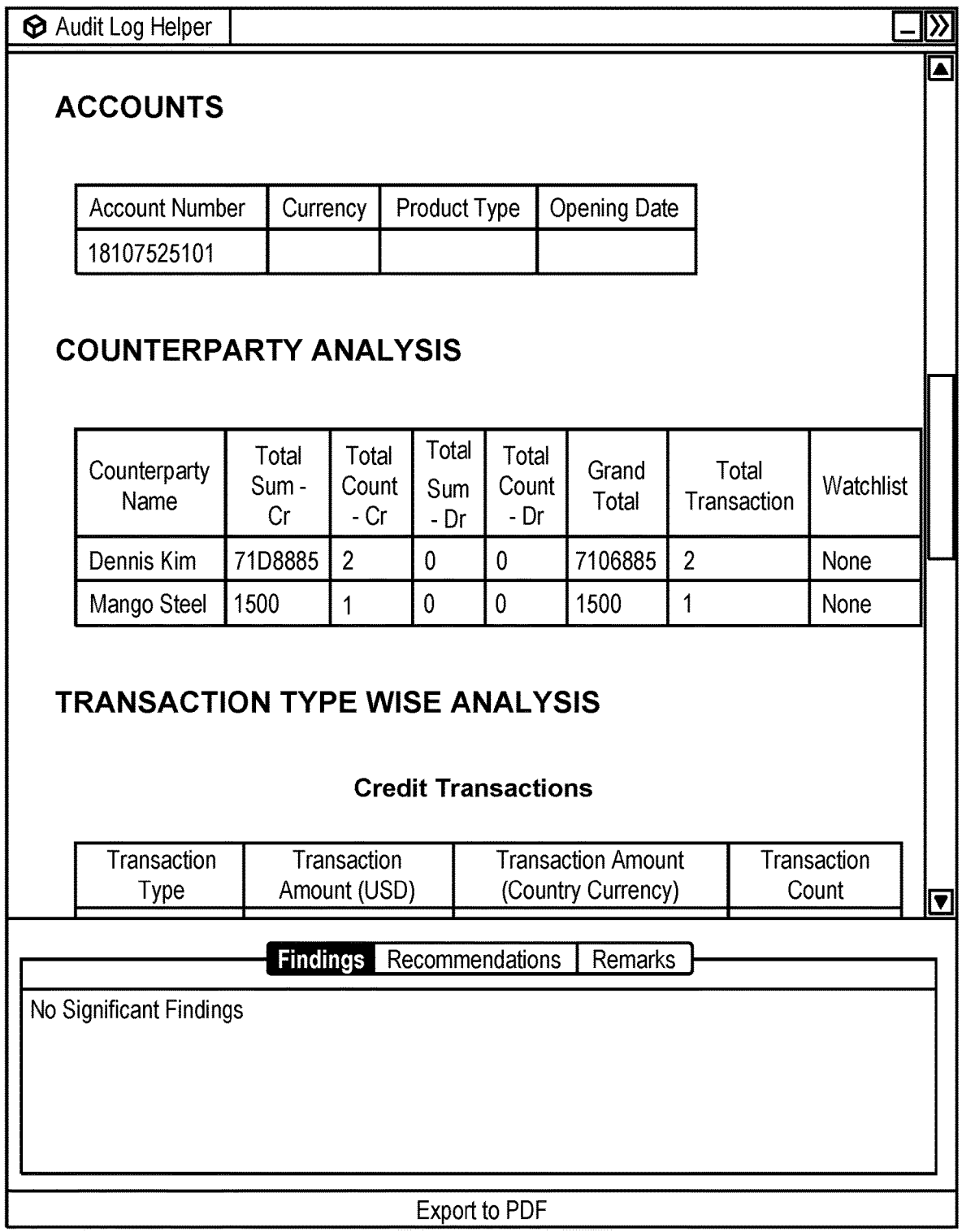
FIG. 5 is a screenshot of an example of a custom user interface that is generated by the custom user interface generator to supplement a primary user interface of a front-end application executing on a client system.

FIG. 5 is a screenshot of an example custom supplementary user interface 400. In various embodiments, the custom supplementary user interface 400 may be generated by the custom user interface generator 152.

As depicted, the custom supplementary user interface 500 includes account information pertaining to a customer who is the subject of the alert. This information includes account numbers, currency, product types, and opening dates for each of the accounts. Here, the data field for the account number of a first account has been filled in with a data item derived from a query result corresponding to a query included in the template based on the mappings and instructions included in the template.

The custom supplementary user interface 500 also includes counterparty information pertaining to transactions that that customer has engaged in. The counterparty information includes, for each identified counterparty, the name of the counterparty, the total sum of credit transactions, the total count of credit transactions, the total sum of debit transactions, the total count of debit transactions, the grand total of the transactions, the grand total transaction count, and information pertaining to whether the counterparty is included on a watch list (e.g., a terrorist or other watch list, such as World-Check). Here, the various data fields of the custom supplementary user interface have been filled in based on query results corresponding to queries specified in the template.

The custom supplementary user interface also includes transaction type wise analysis broken down by credit type (e.g., credit, debit, wire transfer, and so on). The data fields for each transaction include transaction type, transaction amount in USD, transaction amount in country currency, and a total transaction count.

The supplementary user interface may include fields for a user to provide additional information pertaining to the investigation of the alert, including findings, recommendations, and remarks.

An audit log report may then be generated based on the information presented in and collected via the custom supplementary user interface for communication to the enterprise knowledgebase platform 104.

Thus, as described above, an application developer may develop a template for a custom user interface for deployment on client systems of an entity. The custom user interface may be designed to automate repetitive tasks performed by users of the client system with respect to investigations of alerts generated by an anti-fraud solution. Furthermore, the custom user interface may be designed to satisfy requirements of the entity with respect to audit log reporting of the investigations (e.g., to show investigative due diligence on behalf of the entity). To quickly develop the application, the developer may use a front-end query language. However, the custom user interface generator 152 may handle translations of queries specified the front-end query language to queries specified in a back-end query language (e.g., to improve the speed at which the enterprise knowledgebase platform 104 is able to process the database queries). A user of the client system may then automatically generate an audit log report conforming to requirements of the entity without having to use various client applications separately to collect the necessary information.

In various embodiments, a templating system (e.g., HTML-based) may allow the application developer to easily change templates with minimal development effort. For example, the templating system may associate values corresponding to particular fields included in a supplementary user interface with values stored in a server database. It may then automatically generate database queries specified in a front-end query language to retrieve the values from the server database corresponding to the particular fields. Additionally, the templating system may make it easy for an application developer to specify which fields are stable (e.g., unlikely to change) or otherwise indicate which fields should be associated with queries specified in the front-end query language versus which fields should be associated with queries specified in a back-end query language. Thus, the application developer may use the templating system to control whether queries corresponding to particular fields are specified in the front-end query language or the back-end query language.

Certain embodiments are described herein as including logic or a number of applications, components, modules, solutions, or mechanisms. Such embodiments may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a computer processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a computer processor configured using software, the computer processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 6:
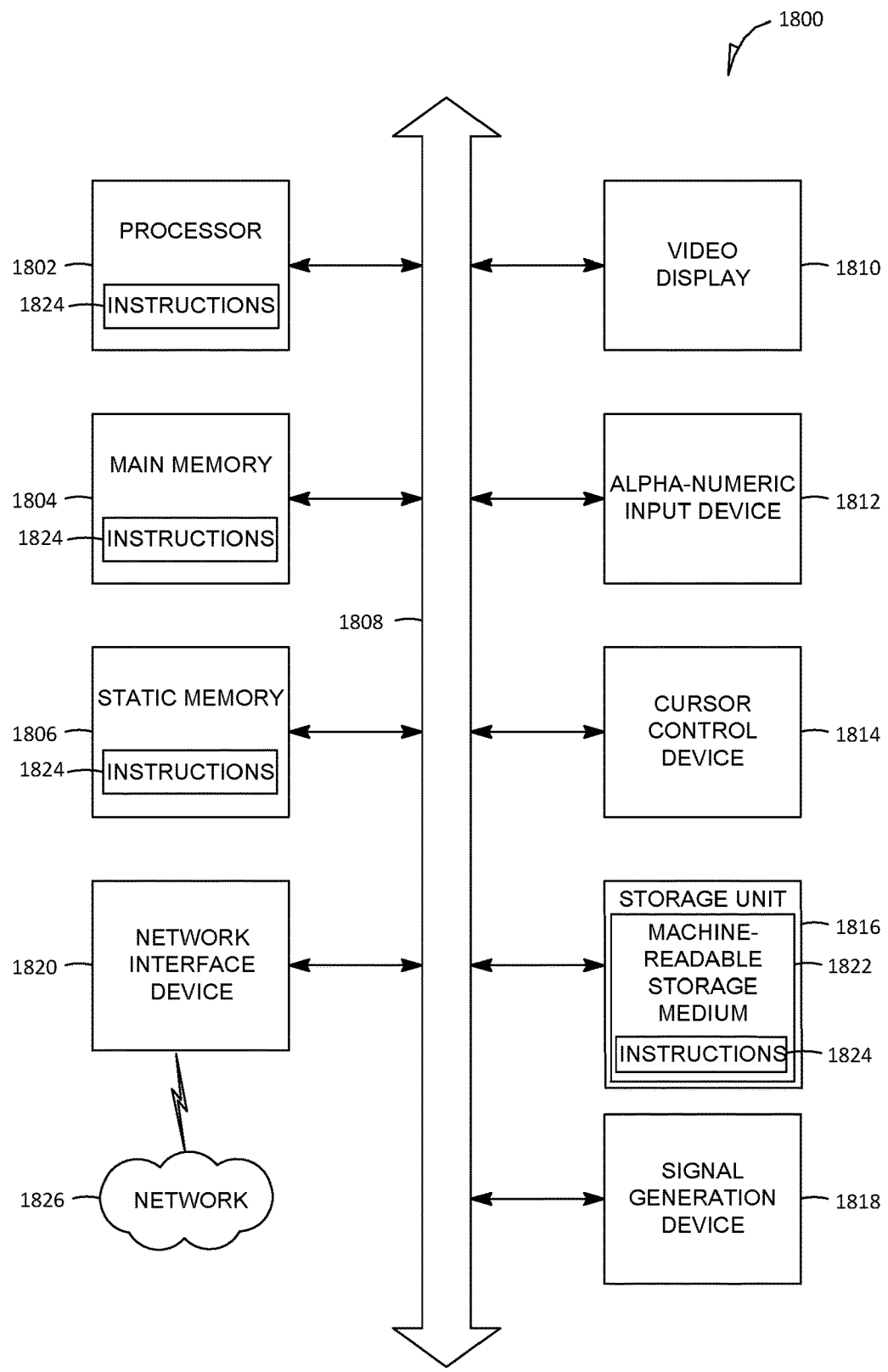
FIG. 6 is a block diagram of machine in the example form of a computer system within which instructions for causing the machine to perform any one or more of the methodologies or operations discussed herein may be executed.

FIG. 6 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    performing operations for generating a supplemental user interface for presentation on a client device in conjunction with a primary user interface presented on the client device, the supplemental user interface including custom data fields to assist a user in completion of investigative steps pertaining to an alert presented in the primary user interface, the operations comprising:
    determining that the alert has been received from a server system and presented in the primary user interface, the alert identifying a suspicious activity that is to be reviewed by the user;
    selecting a template for the supplemental user interface from a plurality of templates based on a type of the alert;
    accessing the template for the supplemental user interface, the template including database queries and instructions for presenting data items derived from query results corresponding to the database queries in the custom data fields, the instructions include a mapping of the data items to the custom data fields and a layout for the custom data fields within the supplemental user interface, wherein the database queries are specified in a front-end query language;
    consolidating two or more of the database queries into an additional database query specified in a back-end query language; and
    receiving query results corresponding to the additional database query;
    presenting the data items derived from the query results in the custom data fields of the supplemental user interface based on the instructions included in the template; and
    updating an audit log based on an acceptance by the user of the data items presented in the custom data fields of the supplemental user interface.

2. The method of claim 1, the operations further comprising selecting the two or more database queries based on an anticipated performance improvement pertaining to the presenting of the data items in the user interface.

3. The method of claim 1, wherein the two or more database queries are each specified in a front-end query language that corresponds to a persistent database store and wherein the back-end query language corresponds to an in-memory data store.

4. The method of claim 1, the operations further comprising:
    translating at least one of the database queries specified in the front-end query language into database queries specified in a back-end query language;
    communicating the database queries specified in the back-end query language to the server system;
    receiving query results corresponding to the database queries specified in the back-end query language; and
    translating the query results corresponding to the database queries specified in the back-end query language into query results corresponding to the database queries specified in the front-end query language.

5. The method of claim 1, further comprising determining the type of the alert based on a detection scenario that triggered the alert.

6. The method of claim 1, wherein each of the plurality of templates is predesigned for a different type of alert.

7. The method of claim 1, wherein the updating of the data log is further based on additional findings, recommendations, or remarks entered by the user into additional data fields of the supplemental user interface.

8. The method of claim 1, wherein the template is predesigned to retrieve and consolidate results of investigative steps for the type of the alert that are manually performable within the primary user interface.

9. A system comprising:
    one or more modules implemented by one or more processors of a client system, the one or more modules configured to perform operations for generating a supplemental user interface for presentation on a client device in conjunction with a primary user interface presented on the client device, the supplemental user interface including custom data fields to assist a user in completion of investigative steps pertaining to an alert presented in the primary user interface, the operations comprising:
    determining that the alert has been received from a server system and presented in the primary user interface, the alert identifying a suspicious activity that is to be reviewed by the user;
    selecting a template for the supplemental user interface from a plurality of templates based on a type of the alert;
    accessing the template for the supplemental user interface, the template including database queries and instructions for presenting data items derived from query results corresponding to the database queries in the custom data fields, the instructions include a mapping of the data items to the custom data fields and a layout for the custom data fields within the supplemental user interface, wherein the database queries are specified in a front-end query language;
consolidating two or more of the database queries into an additional database query specified in a back-end query language; and
receiving query results corresponding to the additional database query;
presenting the data items derived from the query results in the custom data fields of the supplemental user interface based on the instructions included in the template; and
updating an audit log based on an acceptance by the user of the data items presented in the custom data fields of the supplemental user interface.

10. The system of claim 9, the operations further comprising selecting the two or more database based on an anticipated performance improvement pertaining to the presenting of the data items in the user interface.

11. The system of claim 10, wherein the front-end query language that corresponds to a persistent database store and wherein the back-end query language corresponds to an in-memory data store.

12. The system of claim 9, the operations further comprising:
translating at least one of the database queries specified in the front-end query language into database queries specified in a back-end query language;
communicating the database queries specified in the back-end query language to the server system;
receiving query results corresponding to the database queries specified in the back-end query language; and
translating the query results corresponding to the database queries specified in the back-end query language into query results corresponding to the database queries specified in the front-end query language.

13. A non-transitory machine readable medium comprising a set of instructions that, when executed by one or more processors of a client system, causes the one or more processors to perform operations for generating a supplemental user interface for presentation on a client device in conjunction with a primary user interface presented on the client device, the supplemental user interface including custom data fields to assist a user in completion of investigative steps pertaining to an alert presented in the primary user interface, the operations comprising, the operations comprising:
determining that the alert has been received from a server system and presented in the primary user interface, the alert identifying a suspicious activity that is to be reviewed by the user;
selecting a template for the supplemental user interface from a plurality of templates based on a type of the alert;
accessing the template for the supplemental user interface, the template including database queries and instructions for presenting data items derived from query results corresponding to the database queries in the custom data fields, the instructions include a mapping of the data items to the custom data fields and a layout for the custom data fields within the supplemental user interface, wherein the database queries are specified in a front-end query language;
consolidating two or more of the database queries into an additional database query specified in a back-end query language; and
receiving query results corresponding to the additional database query;
presenting the data items derived from the query results in the custom data fields of the supplemental user interface based on the instructions included in the template; and
updating an audit log based on an acceptance by the user of the data items presented in the custom data fields of the supplemental user interface.

14. The non-transitory machine readable medium of claim 13, the operations further comprising selecting the two or more database queries based on an anticipated performance improvement pertaining to the presenting of the data items in the user interface.

15. The non-transitory machine readable medium of claim 13, wherein the front-end query language corresponds to a persistent database store and wherein the back-end query language corresponds to an in-memory data store.

* * * * *